Nov. 25, 1958 E. ROHR 2,861,796
INDEPENDENT WHEEL SPRING SUSPENSION
Filed May 5, 1955 3 Sheets-Sheet 1
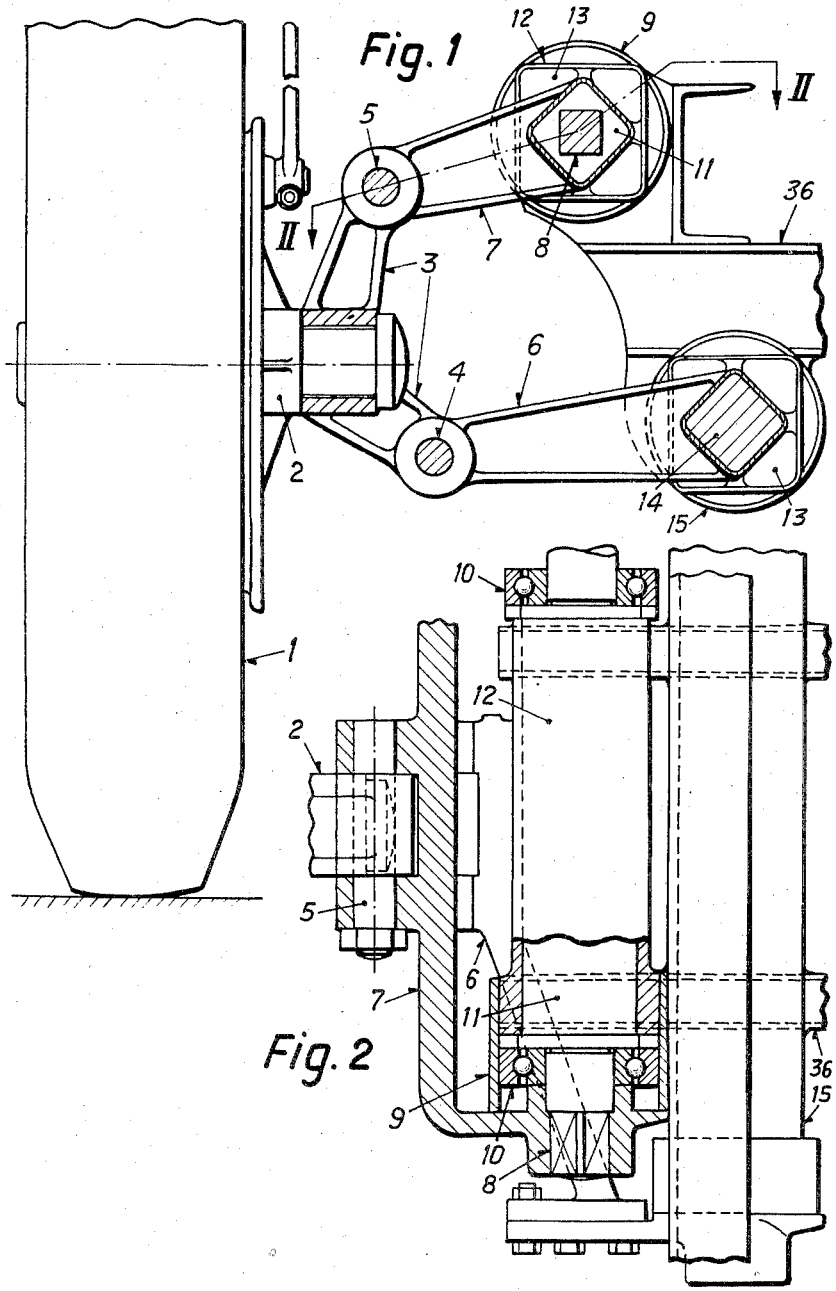
INVENTOR.
ERNST ROHR Nov. 25, 1958

E. ROHR 2,861,796

INDEPENDENT WHEEL SPRING SUSPENSION

Filed May 5, 1955

INVENTOR.
ERNST ROHR
BY (# United States Patent Office)

2,861,796
Patented Nov. 25, 1958

---

2,861,796

INDEPENDENT WHEEL SPRING SUSPENSION

Ernst Rohr, Hunzenschwil/Ag, Switzerland

Application May 5, 1955, Serial No. 506,328

Claims priority, application Switzerland May 7, 1954

2 Claims. (Cl. 267—21)

The present invention relates to a spring suspension device, particularly for use in connection with vehicles with independent axles.

The spring suspensions known at present for vehicles can be divided into the following main groups: leaf-type springs, helical springs, torsion-bar springs, rubber shock absorbers, and compressed-air absorbers.

All the springs used hitherto are designed to meet quite definite requirements. As a rule a certain load is specified and a certain pitch of spring is sought. When the spring performs its work, an inner load tension occurs which is dependent on the cross-section of the spring. All the values that have to be taken into consideration inside a spring can be easily illustrated collectively in the spring characteristic. These are essentially the same values with all types of spring, although in various designs, such as for instance torsion bars and rubber shock absorbers, additional values, such as for instance the torsion angle, the crank swing arms and others, also play a part.

All designs and embodiments of spring suspensions, however, are only intended to absorb as well as possible the shock which is produced on the spring, while to absorb the recoil and to dissipate the free vibration as quickly as possible, special absorbers are always required which, without exception, work against the action of the actual spring. The most obvious example of this is found in the pure friction shock absorbers such as are still fitted today to racing cars and motor cycles. In addition, there are other types of absorbers which have a one-sided action and leave the spring more or less freedom of movement in one direction, but absorb its movement in the other direction. Such absorbers, irrespective of whether they are hydraulically, pneumatically or electrically operated, act simply as brakes in the course of the spring's oscillation, and they are thus thoroughly suited always to disturb as well the upward oscillation of the spring as they interpolate themselves temporally in its pure oscillation course. All such embodiments can therefore only be regarded as makeshifts.

The conditions are somewhat better with rubber shock absorbers and compressed-air shock absorbers. It can be seen from the characteristic of the rubber shock absorber that—in contrast to all steel springs—the line is no longer absolutely straight, but is curved. Also, the tensioning action of the spring has a different characteristic from its compression action. Obviously, therefore, its resilience will be dissipated and not recovered within one oscillation course. The conditions are not yet completely clear since experience has shown that rubber shock absorbers do not heat up, as would be expected in this case. Also, the life of such spring suspension elements is so long that molecular rearrangements, which would use up resilience, cannot be reckoned with.

On the other hand, the conditions with pure compressed-air absorbers are substantially different. Here a large part of the resilience is transmitted in the form of heat to the compressed air and then cooled off on the suspension housings. In this case, too, therefore, the characteristics of the absorber's swelling and cushioning are different. The difference is, in fact, heat.

The object of the present invention is to create a spring suspension device which obviates the abovementioned disadvantages and has a self-attenuating action. The suspension device according to the invention is characterized by the fact that two members, arranged so that they are movable in respect of each other, are in operative connection with each other via at least two spring suspension elements having different courses of oscillation, so as to achieve an attenuation of the movements of the two members in relation to each other by means of a disharmonious overlapping of the two vibrations.

Several embodiments of the spring suspension device according to the invention are illustrated in the attached drawing, in which:

Fig. 1 is a partial sectional front view of a wheel mounting by means of oscillating independent axles with a spring suspension device according to a first embodiment;

Fig. 2 shows the wheel mounting in section along the line II—II in Fig. 1;

Figure 3:
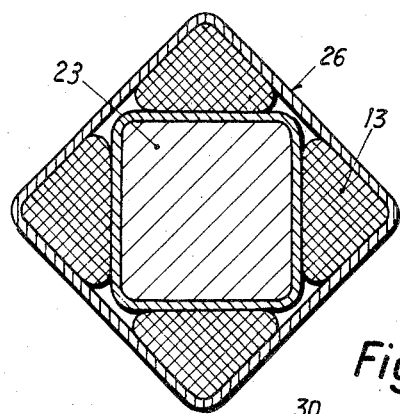
Fig. 3 is a cross-section of a portion of the invention illustrating the deformable material used in the spring suspension device according to Figs. 1 and 2.
Figure 4:
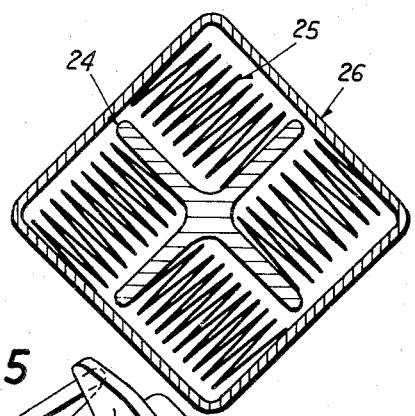
Fig. 4 is a partial cross-sectional of a modified embodiment of the invention.

Referring now more particularly to the drawings, Fig. 1 shows a wheel 1 rotatably mounted on a pivot axle 2 which is arranged in a two-armed bracket 3. A lower and an upper swing arm 6 and 7, respectively, are articulated via bolts 4 and 5, respectively, to the bracket 3. The other end of the upper swing arm 7 is rotatably mounted via a bearing bolt 8 in a ball bearing 10 arranged in the housing 9. The latter is welded to a chassis 36 (partially illustrated). The bolt 8 has a square central section 11 which is mounted in the likewise square housing section 12 in a spring suspension element formed by four corner pieces or elements 13 made of a resilient, deformable material. These resilient elements are seated in the corners of said housing section and are propped against or abut the boundary walls of said bolt or central section, accommodated in said housing section as shown in Figs. 1, 3 and 4. The ball bearings 10 ensure the radial guiding of the bolt 8 or of the swing arm 7. In the same way as the upper swing arm, the lower one is mounted via a bolt 14 in a housing 15 on the chassis, which housing is provided with a spring suspension element. The distance between the axes of the two bolts 4 and 5 is such that for the two swing arms to be connected to the bracket 3 they must be swung out of their inoperative position in respect of each other counter to the action of the spring suspension elements 13 so that a slight initial pretension results in both spring suspension elements.

As can be seen from Fig. 1, the two swing arms 6 and 7 are of unequal length so that a certain deflection on the wheel 1 results in unequal angles of traverse of the swing arms 6 and 7 or of the bearing bolts 8 and 14, whereby the load on the spring suspension elements is also unequal.

Thus, with characteristics which are in themselves equal, an unequal course of oscillation for the two spring suspension elements results.

Figure 6:
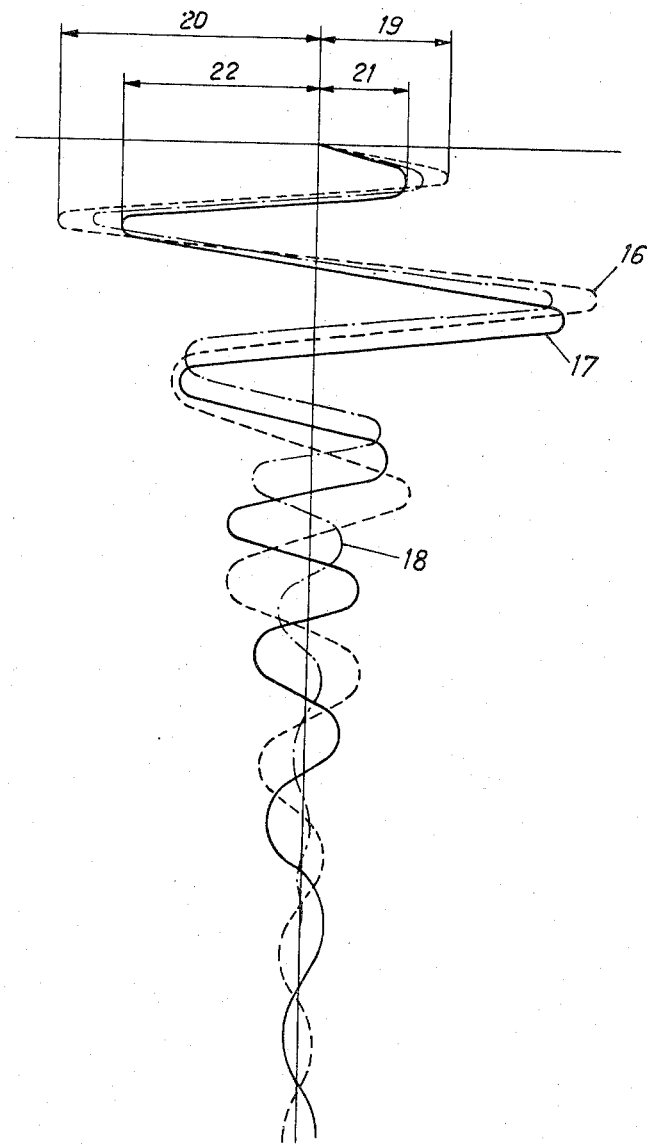
Fig. 6 is an oscillation diagram of the spring suspension device according to Figs. 1 and 2.

The course of oscillation is diagrammatically illustrated in Fig. 6. In it the oscillation frequencies of the two spring suspension elements are designated 16 and 17, while the curve marked 18 represents the frequency resulting from the two frequencies 16 and 17. The dimensions 19 and 20 designate the magnitudes of the shock or the recoil of the spring element 16, while the dimensions 21 and 22 indicate those of the spring element 17. It can be seen from the diagram that as a result of the shock being unequal for the two spring elements (unequal torsion of the swing arms), the oscillation frequencies of the said elements are disharmoniously superposed. The unequal temporal course thus causes a substantial attenuation of the resultant oscillation, as shown by the curve 18. It is of course also possible to mount the wheel not on two, but on three or four arms, at least two of the said arms being guided via spring suspension elements, while the others take over the task of guiding the wheel. The swing arms provided with spring suspension elements may engage the wheel bracket with forks. The mounting will not be constructionally redundant if more than two levers are used.

Instead of the spring suspension elements as illustrated in Fig. 3, those according to Fig. 4 can also be used. Here the recessed square 23 is replaced by a four-legged section 24 on which the springs 25 supported on the inner walls of the outer square 26 act.

Furthermore, it is of course also possible to use other spring suspension elements, such as torsion bars for instance.

An effectively absorbing superposition of the oscillation of the spring suspension elements can also be achieved by suitable pretensioning of the said elements since extensive changes of frequency of spring elements which are in themselves equal can also be obtained in this way.

Another way of obtaining different frequencies is to vary the strength, i. e. the magnitude or, in the case of torsion bars, the span or the cross-section of the spring elements in a spring suspension device.

Figure 5:
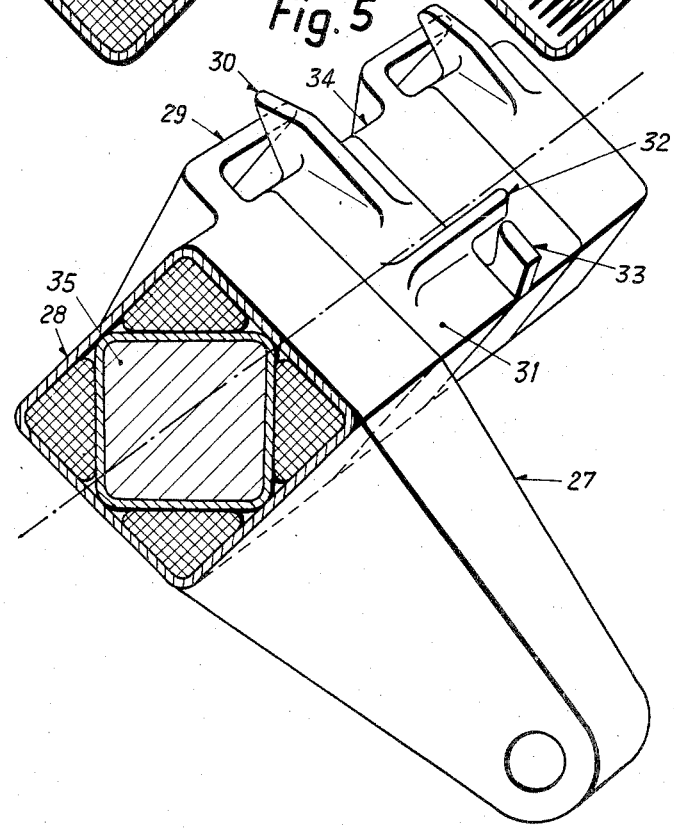
Fig. 5 is a spring suspension device according to a further embodiment.

An additional way of obtaining frequencies which are disharmoniously superposed, consists in displacing temporally in respect of each other the ranges of action of the individual spring suspension elements used in a spring suspension device. Such an embodiment is illustrated in Fig. 5. The spring element 28 carrying the swing arm 27 has a shoulder 29 which cooperates with the nose 30 of a spring element 31 after the swing arm has turned a certain amount. The said element 31 has, in its turn, a shoulder 32 which engages a nose 33 of a spring element 34 after the swing arm 27 has turned a certain amount further, etc. The spring elements here are arranged on a common square shaft 35. The course of oscillation is thus laterally displaced in this case by a further element being actuated only after one element has been turned or loaded to a certain extent. In this case, too, individual elements can be pretensioned, and this can be done positively or negatively, i. e. counter to or in the same direction of rotation as the shock effect.

It is also possible in this case to connect in series spring elements having characteristics which are in themselves different.

Although the spring suspension device is preferably applied with torsion spring elements, it is also possible to use leaf-type springs for instance.

A spring suspension device according to one of the embodiments described in the foregoing can of course also be used on various types of machine wherever the oscillation movements of two parts, which are cushioned in respect of each other, have to be attenuated.

Having now particularly ascertained and described the nature of my said invention and in what manner the same is to be performed, I declare that what I claim is:

1. A resilient suspension device for a vehicle axle comprising a two-armed bracket terminating in respective end pivots, two oscillatory arm members of unequal length pivotably connected to said end pivots, said arm members being disposed in superposed relation to each other, said arm members being provided with polygonal-shaped housing sections and with central polygonal bolt sections embraced by said housing sections, and resilient deformable elements seated in the corners of said polygonal housing sections and propped against the opposite walls of the polygonal bolt sections without deformation of said elements when said bolt sections are in a neutral position, the distance between the axes of said pivots being such that said bolt sections are initially rotated so that said arm members when swinging from an initial position to operative position must overcome an initial compression imparted to at least some of said resilient elements accommodated between said housing section and said bolt section, whereby the said elements oscillate at different frequencies causing a substantial attenuation of the oscillation of a vehicle axle.

2. In a suspension device according to claim 1, wherein one of said arm members is shorter than the other of said arm members, said one of said arm members being arranged above said other of said arm members, said resilient elements within said polygonal-shaped housing section of said one of said arm members being less deformable than the resilient elements within said other of said arm members.

References Cited in the file of this patent

UNITED STATES PATENTS

| 2,007,202 | Kliesrath | July 9, 1935 |
| 2,226,406 | Krotz | Dec. 24, 1940 |
| 2,477,187 | Lanchner | July 26, 1949 |
| 2,590,711 | Krotz | Mar. 25, 1952 |
| 2,606,759 | Colby | Aug. 12, 1952 |
| 2,712,742 | Neidhart | July 12, 1955 |

FOREIGN PATENTS

| 427,907 | Great Britain | May 2, 1934 |
| 606,635 | Germany | Dec. 6, 1934 |
| 660,443 | Great Britain | Nov. 7, 1951 |